United States Patent
Das et al.

(10) Patent No.: US 9,612,974 B2
(45) Date of Patent: Apr. 4, 2017

(54) STORING SERVICE LEVEL AGREEMENT COMPLIANCE DATA

(71) Applicant: INTERNATIONAL BUSINESS MACHINES CORPORATION, Armonk, NY (US)

(72) Inventors: Rajarshi Das, Bangalore (IN); Aaron C. Sawdey, Cannon Falls, MN (US); Philip L. Vitale, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/864,512

(22) Filed: Sep. 24, 2015

(65) Prior Publication Data

US 2017/0060766 A1 Mar. 2, 2017

Related U.S. Application Data

(63) Continuation of application No. 14/838,816, filed on Aug. 28, 2015.

(51) Int. Cl.
| | |
|---|---|
| G06F 9/46 | (2006.01) |
| G06F 12/1009 | (2016.01) |
| H04L 12/24 | (2006.01) |
| G06F 12/02 | (2006.01) |

(52) U.S. Cl.
CPC ........ *G06F 12/1009* (2013.01); *G06F 12/023* (2013.01); *H04L 41/5032* (2013.01); *G06F 2212/1044* (2013.01)

(58) Field of Classification Search
None
See application file for complete search history.

(56) References Cited

U.S. PATENT DOCUMENTS

| | | | |
|---|---|---|---|
| 3,518,633 A | 6/1970 | Croy | |
| 6,085,216 A * | 7/2000 | Huberman | ............... G06F 9/50 718/102 |
| 6,658,654 B1 | 12/2003 | Berry et al. | |
| 7,620,950 B2 | 11/2009 | Mathias et al. | |
| 2004/0068447 A1 | 4/2004 | Mao et al. | |
| 2005/0086028 A1 | 4/2005 | Jones et al. | |
| 2008/0072236 A1* | 3/2008 | Pope | .................... G06F 9/4843 718/108 |
| 2013/0007379 A1 | 1/2013 | Kegel et al. | |
| 2014/0136707 A1 | 5/2014 | Beaty et al. | |

* cited by examiner

*Primary Examiner* — Craig Dorais
(74) *Attorney, Agent, or Firm* — Kunzler Law Group

(57) ABSTRACT

A method for storing service level agreement ("SLA") compliance data includes reserving a memory location to store SLA compliance data of a software thread. The method includes directing the software thread to run on a selected hardware device. The method includes enabling SLA compliance data to be stored in the memory location. The SLA compliance data is from a hardware counting device in communication with the selected hardware device. The SLA compliance data corresponds to operation of the software thread on the selected hardware device.

10 Claims, 11 Drawing Sheets

STORING SERVICE LEVEL AGREEMENT COMPLIANCE DATA

FIELD

The subject matter disclosed herein relates to service level agreements ("SLAs") and more particularly relates to storing service level agreement compliance data.

BACKGROUND

Information handling devices, such as desktop computers, laptop computers, tablet computers, smart phones, optical head-mounted display units, smart watches, etc., are ubiquitous in society. An information handling device generally includes a processor. Data corresponding to operations of the processor may be used to determine adherence to SLAs.

BRIEF SUMMARY

An apparatus for storing service level agreement ("SLA") compliance data is disclosed. A method and a computer program product also perform the functions of the apparatus. The apparatus includes a reservation module that reserves a memory location to store SLA compliance data of a software thread. The apparatus includes a directing module that directs the software thread to run on a selected hardware device. The apparatus includes an enabling module that enables SLA compliance data to be stored in the memory location. The SLA compliance data is from a hardware counting device in communication with the selected hardware device. The SLA compliance data corresponds to operation of the software thread on the selected hardware device.

In one embodiment, the reservation module reserves the memory location in response to the software thread being initiated. In another embodiment, the memory location is read-only by an operating system and directly accessible for writing by the hardware counting device. In some embodiments, the memory location is updated by the hardware counting device at an update interval that matches a clock rate of the selected hardware device. In an embodiment, the SLA compliance data includes a timebase ("TB") and an instruction count ("IC").

In one embodiment, the apparatus includes a paging module that creates a page table entry having a memory address of the memory location. In another embodiment, the apparatus includes a linking module that provides a memory address of the memory location to an operating system to enable the operating system to read data as a function of the memory address. In some embodiments, the enabling module includes a registration module that loads a memory address of the memory location into a register that holds the memory address during the software thread being run on the selected hardware device.

In one embodiment, the apparatus includes a computation module that calculates a weighted average workrate as a function of the SLA compliance data of the software thread. In another embodiment, the apparatus includes a results module that outputs a weighted average workrate of the SLA compliance data of the software thread. In some embodiments, the hardware counting device operates independently from the selected hardware device. In one embodiment, the software thread includes a first software thread and a second software thread. In such an embodiment, the enabling module enables SLA compliance data corresponding to operation of the first software thread on the selected hardware device to be stored in a first memory location, and the enabling module enables SLA compliance data corresponding to operation of the second software thread on the selected hardware device to be stored in a second memory location.

In another embodiment, the apparatus includes a computing device. In such an embodiment, the computing device may include the selected hardware device. Moreover, in such an embodiment, the selected hardware device may include the hardware counting device. The hardware counting device may be embedded in the selected hardware device.

A method for storing SLA compliance data includes reserving a memory location to store SLA compliance data of a software thread. The method includes directing the software thread to run on a selected hardware device. The method includes enabling SLA compliance data to be stored in the memory location. The SLA compliance data is from a hardware counting device in communication with the selected hardware device. The SLA compliance data corresponds to operation of the software thread on the selected hardware device.

In one embodiment, the method includes creating a page table entry having a memory address of the memory location. In another embodiment, the method includes providing a memory address of the memory location to an operating system to enable the operating system to read data as a function of the memory address. In some embodiments, the method includes loading a memory address of the memory location into a register that holds the memory address during the software thread being run on the selected hardware device.

A computer program product includes a computer readable storage medium having program instructions embodied therewith. The program instructions are executable by a processor for reserving a memory location to store SLA compliance data of a software thread. The program instructions are also executable by the processor for directing the software thread to run on a selected hardware device. The program instructions are executable by the processor for enabling SLA compliance data to be stored in the memory location. The SLA compliance data is from a hardware counting device in communication with the selected hardware device. The SLA compliance data corresponds to operation of the software thread on the selected hardware device.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Figure 1:
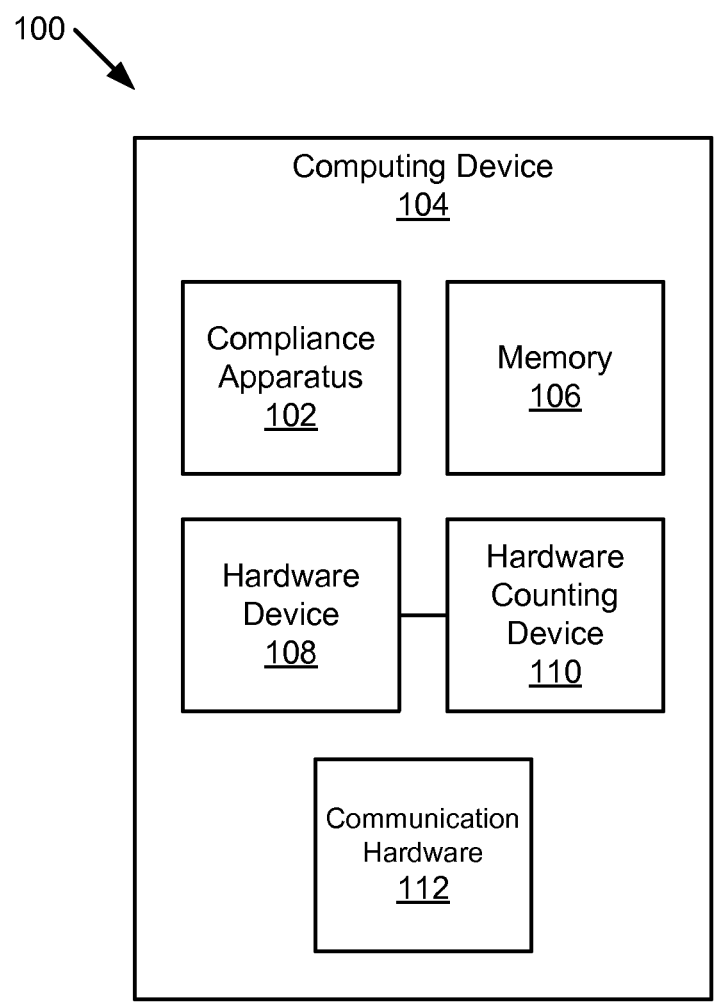
FIG. 1 is a schematic block diagram illustrating one embodiment of a system for storing service level agreement ("SLA") compliance data in accordance with one embodiment of the present invention.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture ("ISA") instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). In some embodiments, electronic circuitry including, for example, programmable logic circuitry, field-programmable gate arrays ("FPGA"), or programmable logic arrays ("PLA") may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. In one embodiment, a module may be implemented in hardware, for example as a hardware circuit comprising custom VLSI circuits or gate arrays, off-the-shelf semiconductors such as logic chips, transistors, or other discrete components. A module may also be implemented in hardware as programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

FIG. 1 is a schematic block diagram illustrating one embodiment of a system 100 for storing service level agreement ("SLA") compliance data in accordance with one embodiment of the present invention. The system 100 includes a compliance apparatus 102 in a computing device 104, wherein the computing device 104 also includes memory 106, a hardware device 108, a hardware counting device 110, and communication hardware 112, which are described below. As may be appreciated, in some embodiments, one or more of the compliance apparatus 102, the memory 106, the hardware device 108, the hardware counting device 110, and the communication hardware 112 may be included on a printed circuit board ("PCB"). Furthermore, in some embodiments, all of the compliance apparatus 102, the memory 106, the hardware device 108, the hardware counting device 110, and the communication hardware 112 may be included on the PCB.

In general, the compliance apparatus 102 provides a way to capture SLA compliance data corresponding to a specific software thread. The compliance apparatus 102 facilitates capturing SLA compliance data using little to no resources from the hardware device 108. Specifically, the compliance apparatus 102 uses the hardware counting device 110 to gather data corresponding to the operation of a specific software thread in real-time, without putting a burden on the hardware device 108. In some embodiments, the hardware counting device 110 may directly record SLA compliance data. Moreover, the compliance apparatus 102 may block SLA compliance data from being tampered with. Furthermore, the compliance apparatus 102 may facilitate inspection of the SLA compliance data during and/or after execution of a software thread.

In one embodiment, the compliance apparatus 102 reserves a memory location of the memory 106 to store SLA compliance data of a software thread. The compliance apparatus 102 directs the software thread to run on the hardware device 108. Moreover, the compliance apparatus 102 enables SLA compliance data to be stored in the memory location. The compliance apparatus 102 receives SLA compliance data from the hardware counting device 110 that is in communication with the hardware device 108. The SLA compliance data corresponds to operation of the software thread on the hardware device 108. The compliance apparatus 102 is described in more detail with regard to the systems 200, 214, 216, and the apparatuses 300, 400 of FIGS. 2A, 2B, 2C, 3, and 4.

The compliance apparatus 102 is depicted in the computing device 104, but may be located in various components and memory of the computing device 104. In one example, the compliance apparatus 102 is implemented in software and all or a portion may be stored in the memory 106 on the computing device 104. In another embodiment, the compliance apparatus 102 is implements in software and hardware. One of skill in the art will recognize other implementations of the compliance apparatus 102 using hardware, software, or both.

The computing device 104 may include any device that includes hardware and/or software used to determine compliance with a SLA. For example, in one embodiment, the computing device 104 includes a desktop computer, a laptop computer, a personal digital assistant ("PDA"), a tablet computer, a smart phone, a smart television (e.g., televisions connected to the Internet), a set-top box, a game console, a security system (including security cameras), a vehicle on-board computer, or the like. In some embodiments, the computing device 104 includes a wearable device, such as a smart watch, a fitness band, an optical head-mounted display, or the like.

The memory 106, in one embodiment, is a computer readable storage medium. In some embodiments, the memory 106 includes volatile computer storage media. For example, the memory 106 may include a random access memory ("RAM"), including dynamic RAM ("DRAM"), synchronous dynamic RAM ("SDRAM"), and/or static RAM ("SRAM"). In some embodiments, the memory 106 includes non-volatile computer storage media. For example, the memory 106 may include a hard disk drive, a flash memory, or any other suitable non-volatile computer storage device. In some embodiments, the memory 106 includes both volatile and non-volatile computer storage media.

In certain embodiments, the memory 106 stores data relating to operation of the compliance apparatus 102. Moreover, in some embodiments, the memory 106 also stores program code and related data, such as an operating system or other controller algorithms operating on the computing device 104.

The hardware device 108, in one embodiment, may include any known controller capable of executing computer-readable instructions and/or capable of performing logical operations. For example, the hardware device 108 may be a microcontroller, a microprocessor, a processor, a central processing unit ("CPU"), a graphics processing unit ("GPU"), an auxiliary processing unit, a field programmable gate array ("FPGA"), or similar programmable controller. In some embodiments, the hardware device 108 executes instructions stored in the memory 106 to perform the methods and routines described herein. The hardware device 108 is communicatively coupled to the memory 106, the hardware counting device 110, and the communication hardware 112.

The hardware counting device 110 may include any known electronic device capable of detecting data corresponding to operation of a software thread on the hardware device 108. In certain embodiments, the hardware counting device 110 is embedded within the hardware device 108. In other embodiments, the hardware counting device 110 is positioned external to the hardware device 108. The hardware counting device 110 may be used to capture data corresponding to a timebase ("TB"), a processor utilization resource register ("PURR"), a scaled processor utilization resource register ("SPURR"), an instruction count ("IC"), and/or a virtual timebase ("VTB"). As may be appreciated, the hardware counting device 110 may capture data in real-time without putting a burden on the hardware device 108. For example, in certain embodiments, the hardware counting device 110 may update a memory location of the memory 106 at an update interval that matches a clock rate of the hardware device 108. In some embodiments, the hardware counting device 110 includes registers used to store captured data. The communication hardware 112 may facilitate communication with other devices. For example, the communication hardware 112 may enable communication via Bluetooth®, WiFi™, and so forth.

Figure 2A:
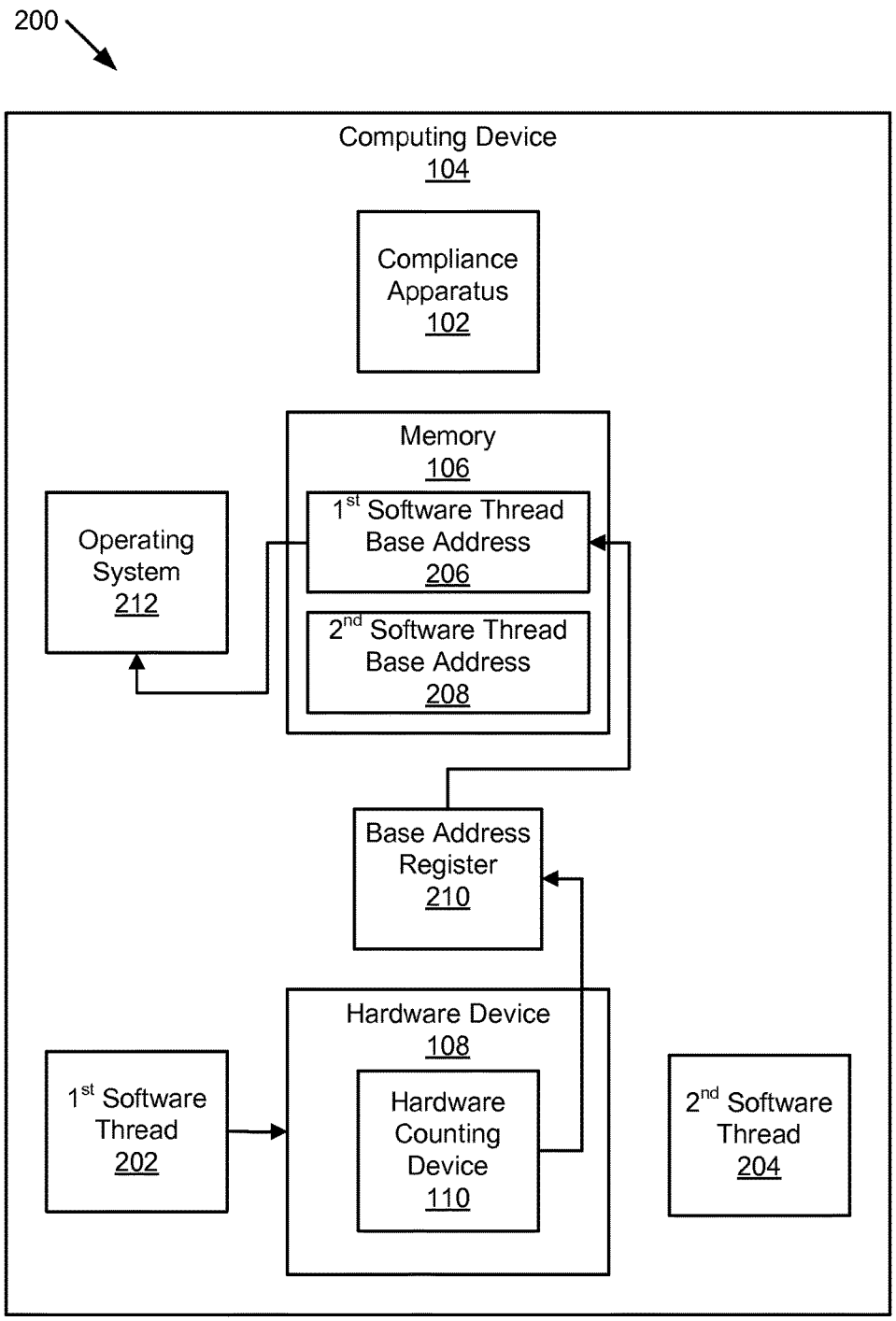
FIG. 2A is a schematic block diagram illustrating another embodiment of a system for storing SLA compliance data in accordance with one embodiment of the present invention.

FIG. 2A is a schematic block diagram illustrating another embodiment of a system 200 for storing SLA compliance data in accordance with one embodiment of the present invention. The system 200 includes one embodiment of the computing device 104 having the compliance apparatus 102, the memory 106, the hardware device 108, and the hardware counting device 110, which are substantially similar to those described above in relation to the system 100 of FIG. 1. Moreover, the computing device 104 includes a first software thread 202 and a second software thread 204, which are described below. The memory 106 includes a first software thread base address 206 and a second software thread base address 208, which are also described below. Furthermore, the computing device 104 includes a base address register 210 and an operating system 212, which are described below.

The first and second software threads 206 and 208 are two different threads that may be initiated on the computing device 104. As may be appreciated, in some embodiments, a software thread includes information used to serve one individual user or a particular service request. Accordingly, to serve multiple users that are using a program a software thread is created for each of them. While only two software threads 206 and 208 are illustrated, the computing device 104 may include one, two, ten, fifty, or more software threads.

The first and second software thread base addresses 206 and 208 are base addresses for storing SLA compliance data corresponding to the first and second software threads 206 and 208, respectively. Specifically, in one embodiment, each of the first and second software thread base addresses 206 and 208 may include memory allocation for the following fields: TB (picket), number of updates, measurement period, PURR, SPURR, VTB, IC, TB (fence), start IC, end IC, start VTB, end VTB, workrate, process ID, and reserved. In some embodiments, each field may have a memory allocation of 8 or 16 bytes, while in other embodiments, each field may have a memory allocation that is smaller than 8 bytes and/or larger than 16 bytes, between 8 and 16 bytes, or any suitable size.

The base address register 210 stores an address corresponding to a software thread being executed. For example, the base address register 210 may store the first software thread base address 206, or the base address register 210 may store the second software thread base address 208. Accordingly, the hardware counting device 110 accesses the base address register 210 in order to obtain the address corresponding to the software thread currently being executed. As such, the hardware counting device 110 does not need to know anything about which software thread is being executed. The operating system 212 may be any suitable operating system that runs on the computing device 104, such as Android, Berkeley Software Distribution ("BSD"), iOS, Linux, OS X, QNX, Microsoft Windows, Windows Phone, IBM z/OS, etc.

During operation of the computing device 104, the first software thread 202 may be executed by the hardware device 108. While the first software thread 202 is being executed by the hardware device 108, the hardware counting device 110 obtains data corresponding to SLA compliance. In certain embodiments, a SLA may be part of a service contract in which service is formally defined. In particular, the SLA may include an agreement between a service provider and a service user regarding particular aspects of the service, such as scope, quality, and/or responsibilities. In such embodiments, data relating to SLA compliance may refer to data that provides information regarding how closely the service being provided matches the service level agreed upon.

The hardware counting device 110 reads the address stored in the base address register 210. In the present example, the first software thread base address 206 is stored in the base address register 210. Accordingly, the hardware counting device 110 writes SLA compliance data to the first software thread base address 206. The operating system 212 may read the SLA compliance data by reading data from the first software thread base address 206. During operation, the hardware device 108 may use its resources solely for executing the first software thread 202, while the hardware counting device 110 obtains SLA compliance data. As may be appreciated, the hardware counting device 110 may provide updated SLA compliance related data to the first software thread base address 206 at a predetermined update rate. In some embodiments, the update rate may match a clock speed used by the hardware device 108, while in other embodiments, the update rate may be proportional to the clock speed.

Figure 2B:
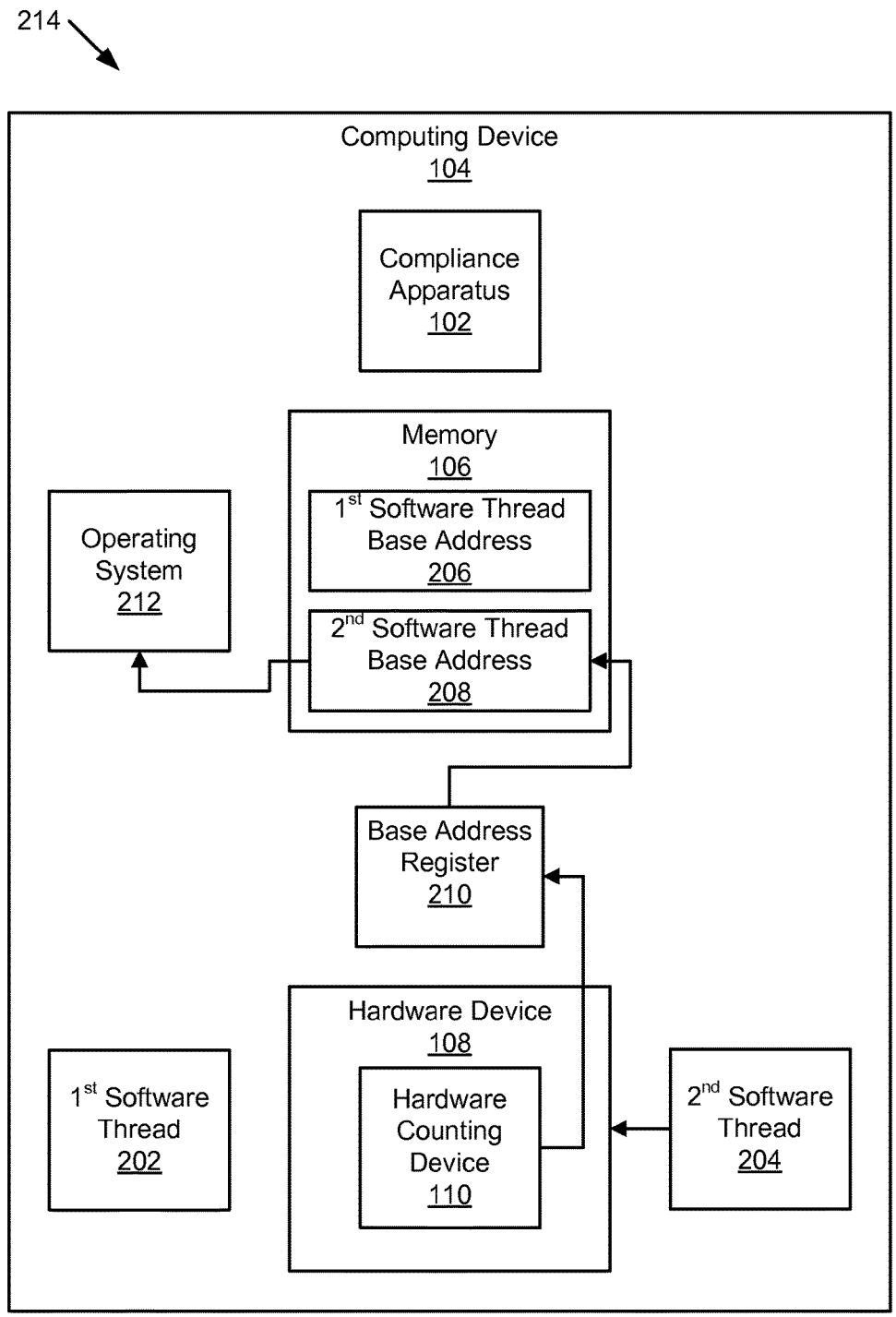
FIG. 2B is a schematic block diagram illustrating a further embodiment of a system for storing SLA compliance data in accordance with one embodiment of the present invention.

FIG. 2B is a schematic block diagram illustrating a further embodiment of a system 214 for storing SLA compliance data in accordance with one embodiment of the present invention. The system 200 includes one embodiment of the computing device 104 having the compliance apparatus 102, the memory 106, the hardware device 108, and the hardware counting device 110, which are substantially similar to those described above in relation to the system 100 of FIG. 1. Moreover, the computing device 104 includes the first software thread 202, the second software thread 204, the first software thread base address 206, the second software thread base address 208, the base address register 210, and the operating system 212, which are substantially similar to those described above in relation to the system 200 of FIG. 2A.

During operation of the computing device 104, the second software thread 204 may be executed by the hardware device 108. While the second software thread 204 is being executed by the hardware device 108, the hardware counting device 110 obtains data corresponding to SLA compliance. The hardware counting device 110 reads the address stored in the base address register 210. In the present example, the second software thread base address 208 is stored in the base address register 210. Accordingly, the hardware counting device 110 writes SLA compliance data to the second software thread base address 208. As may be appreciated, if the hardware device 108 switches to executing the first software thread 202, the first software thread base address 206 may be stored in the base address register 210.

The operating system 212 may read the SLA compliance data by reading data from the second software thread base address 208. During operation, the hardware device 108 may use its resources solely for executing the second software thread 204, while the hardware counting device 110 obtains SLA compliance data. As may be appreciated, the hardware counting device 110 may provide updated SLA compliance related data to the second software thread base address 208 at a predetermined update rate. In some embodiments, the update rate may match a clock speed used by the hardware device 108, while in other embodiments, the update rate may be proportional to the clock speed.

It should be noted that certain embodiments may include multiple hardware threads (e.g., multiple hardware devices 108) and also include one base address register 210 for each hardware thread. In such embodiments, multiple software threads may be executed simultaneously on different hardware threads. In one example, premium software threads may use one hardware thread with a corresponding base address register 210 and non-premium software threads may use another hardware thread with a corresponding base address register 210.

Figure 2C:
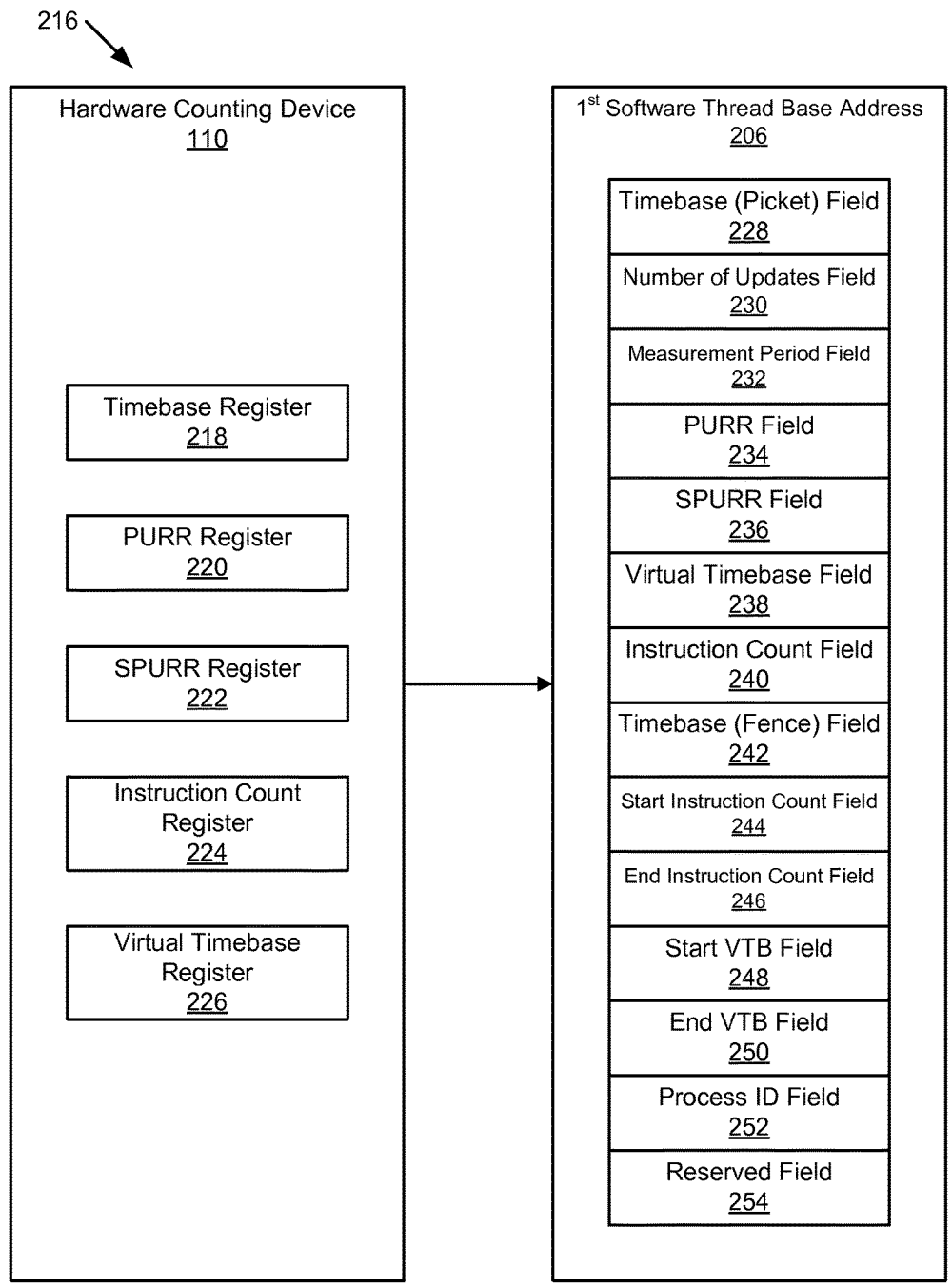
FIG. 2C is a schematic block diagram illustrating an additional embodiment of a system for storing SLA compliance data in accordance with one embodiment of the present invention.

FIG. 2C is a schematic block diagram illustrating an additional embodiment of a system 216 for storing SLA compliance data in accordance with one embodiment of the present invention. The system 216 includes one embodiment of the hardware counting device 110 and the first software thread base address 206, which are substantially similar to those described above in relation to the system 200 of FIG. 2. Moreover, the hardware counting device 110 includes a TB register 218, a PURR register 220, a SPURR register 222, an IC register 224, and a VTB register 226, which are described below. The first software thread base address 206 includes a TB (picket) field 228, a number of updates field 230, a measurement period field 232, a PURR field 234, a SPURR field 236, a VTB field 238, an IC field 240, a TB (fence) field 242, a start IC field 244, an end IC field 246, a start VTB field 248, an end VTB field 250, a process ID field 252, and a reserved field 254, which are also described below.

The TB register 218 stores a TB. The PURR register 220 stores processor utilization resource register data. The SPURR register 222 stores scaled processor utilization resource register data. The IC register 224 stores an IC. The virtual TB register 226 stores a virtual TB. At every update interval during execution of the first software thread 202, the hardware counting device 110 populates the TB (picket) field 228, the number of updates field 230, the measurement period field 232, the PURR field 234, the SPURR field 236, the virtual TB field 238, the IC field 240, and the TB (fence) field 242 using data from the TB register 218, the PURR register 220, the SPURR register 222, the VTB register 226, and the IC register 224.

For example, the PURR field 234, the SPURR field 236, the VTB field 238, and the IC field 240 may be updated by copying data directly from the PURR register 220, the SPURR register 222, the VTB register 226, and the IC register 224, respectively. As another example, the TB (picket) field 228 and the TB (fence) field 242 may be updated based on the TB register 226. As yet another example, the number of updates field 230 may be incremented each time data is written to the other fields. In addition, the measurement period field 232 may be calculated based on a starting TB or VTB and a current TB or VTB. Such a calculation may be performed by the hardware counting device 110.

Moreover, during the first update, a hypervisor copies the IC from the IC register 224 into the start IC field 244, and the VTB from the VTB register 226 into the start VTB field

248. Furthermore, during the first update, the hypervisor copies the process ID into the process ID field 252. When a software thread is terminated, the hypervisor copies the IC from the IC register 224 into the end IC field 246, and the VTB from the VTB register 226 into the end VTB field 250. The reserved field 254 may be used by the hypervisor for any suitable purpose.

Figure 3:
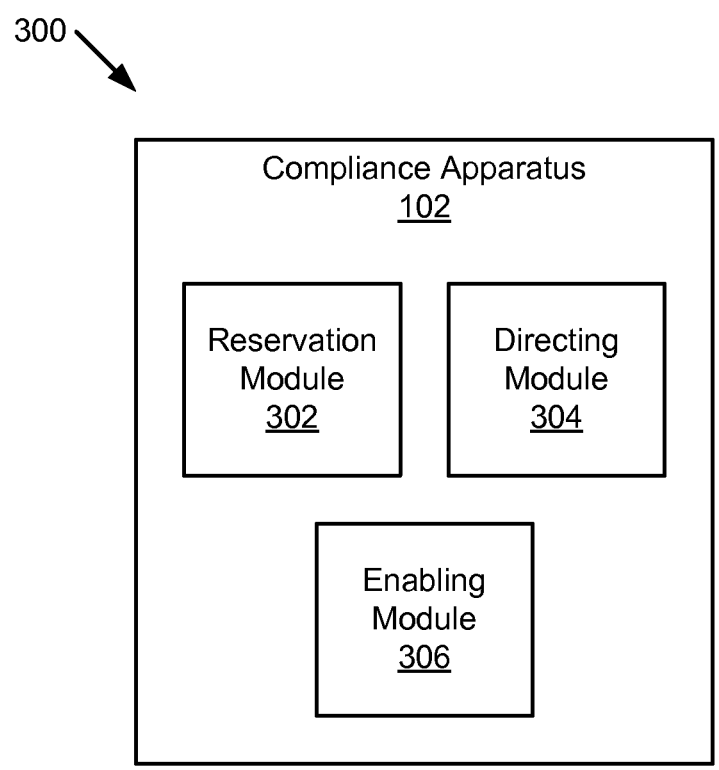
FIG. 3 is a schematic block diagram illustrating one embodiment of an apparatus for storing SLA compliance data in accordance with one embodiment of the present invention.

FIG. 3 is a schematic block diagram illustrating one embodiment of an apparatus 300 for storing SLA compliance data in accordance with one embodiment of the present invention. The apparatus 300 includes one embodiment of the compliance apparatus 102 with a reservation module 302, a directing module 304, and an enabling module 306, which are described below.

The reservation module 302, in one embodiment, reserves a memory location to store SLA compliance data of a software thread, such as the first and second software threads 202 and 204. In certain embodiments, the reservation module 302 reserves the memory location in response to the software thread being initiated. The memory location may be part of the memory 106, or any other suitable memory. For example, the memory location may have an address corresponding to one of the first or second software thread base addresses 206 and 208. In some embodiments, the memory location may be read-only by the operating system 212. Moreover, the memory location may be directly accessible for writing by the hardware counting device 110.

The SLA compliance data may include any suitable data corresponding to the software thread. For example, the SLA compliance data may include data corresponding to a TB (picket), a number of updates, a measurement period, a PURR, a SPURR, a VTB, an IC, a TB (fence), a start IC, an end IC, a start VTB, an end VTB, a process ID, and the like. In certain embodiments, the reservation module 302 may function as part of a hypervisor.

The directing module 304, in one embodiment, directs the software thread to run on a selected hardware device 108, or any other suitable hardware device. As may be appreciated, in certain embodiments, while the software thread is executed on the selected hardware device 108, nothing else is executed on the selected hardware device 108. In some embodiments, the directing module 304 may function as part of the hypervisor.

The enabling module 306, in one example, enables SLA compliance data from a hardware counting device 110, to be stored in the memory location. In certain embodiments, the hardware counting device 110 is embedded in the selected hardware device 108, while in other embodiments the hardware counting device 110 is in communication with the selected hardware device 108. The SLA compliance data corresponds to operation of the software thread on the selected hardware device 108. In certain embodiments, the memory location may be updated by the hardware counting device 110 at an update interval that matches a clock rate of the selected hardware device 108, while in other embodiments, the memory location may be updated by the hardware counting device 110 at an update interval that is proportional to the clock rate of the hardware counting device 110. In some embodiments, the enabling module 306 may function as part of the hypervisor.

In certain embodiments, the hardware counting device 110 operates independently from the selected hardware device 108. In such embodiments, the operation of the hardware counting device 110 does not impact (e.g., slow down, burden, etc.) the selected hardware device 108. Moreover, in some embodiments, the software thread includes a first software thread 202 and a second software thread 204.

In such embodiments, the enabling module 306 enables SLA compliance data corresponding to operation of the first software thread 202 on the selected hardware device 108 to be stored in a first memory location, such as a memory location corresponding to the first software thread base address 206. Moreover, the enabling module 306 enables SLA compliance data corresponding to operation of the second software thread 204 on the selected hardware device 108 to be stored in a second memory location, such as a memory location corresponding to the second software thread base address 208.

In certain embodiments, at least a portion of the reservation module 302, the directing module 304, and the enabling module 306 includes one or more of hardware and program instructions. The program instructions may be stored on one or more computer readable storage media.

Figure 4:
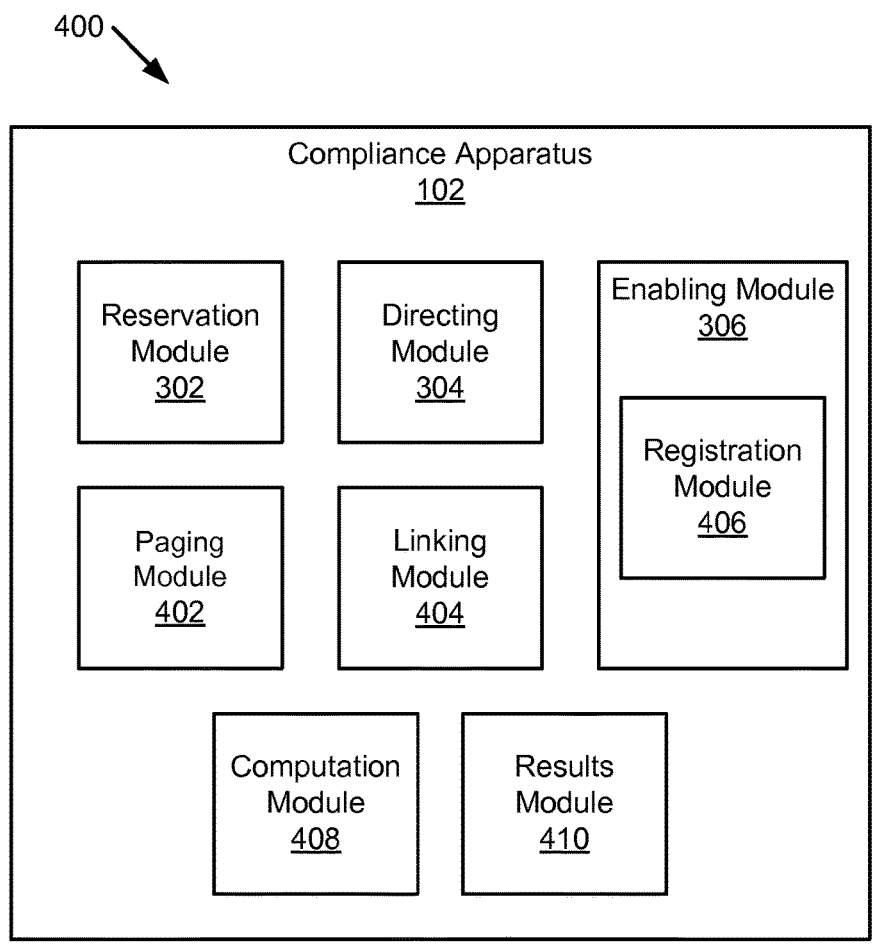
FIG. 4 is a schematic block diagram illustrating another embodiment of an apparatus for storing SLA compliance data in accordance with one embodiment of the present invention.

FIG. 4 is a schematic block diagram illustrating another embodiment of an apparatus 400 for storing SLA compliance data in accordance with one embodiment of the present invention. The apparatus 400 includes one embodiment of the compliance apparatus 102 with the reservation module 302, the directing module 304, and the enabling module 306, which are substantially similar to those described above in relation to the apparatus 300 of FIG. 3. In various embodiments, the apparatus 400 may include a paging module 402 and a linking module 404, which are described below. In some embodiments, the enabling module 306 may include a registration module 406, which is also described below. In certain embodiments, the apparatus 400 may include a computation module 408 and a results module 410, which are also described below.

The paging module 402 creates, in one embodiment, a page table entry having a memory address of the memory location that is to store the SLA compliance data for a specific software thread. Specifically, the page table entry may include the memory address, a hardware bit, a process ID, and a thread ID. The hardware bit is a bit corresponding to the hardware that includes the memory address. The process ID is an ID corresponding to the process that corresponds to the software thread. The thread ID is a unique ID associated with the software thread. In some embodiments, the paging module 402 may function as part of the hypervisor.

The linking module 404, in one embodiment, provides a memory address of the memory location to an operating system 212 to enable the operating system 212 to read data as a function of the memory address. Thus, the operating system 212 may access the memory address to read the SLA compliance data that is populated therein. As may be appreciated, the operating system 212 may be any suitable operating system. In certain embodiments, the memory location may be protected so that it is read-only by the operating system 212. In such embodiments, the integrity of the SLA compliance data is protected because the SLA compliance data cannot be modified by the operating system 212. In some embodiments, the linking module 404 may function as part of the hypervisor.

The registration module 406, in one embodiment, loads a memory address of the memory location into a register that holds the memory address during the software thread being run on the selected hardware device 108. Specifically, in certain embodiments, the registration module 406 loads the memory address, such as one of the first or second software thread base addresses 206 and 208 into a premium thread domain base address register ("PTDBAR"), such as the base address register 210. In one embodiment, the memory address is a premium thread domain base address ("PT- DBA"). In some embodiments, the registration module 406 may function as part of the hypervisor.

The computation module 408, in one example, calculates a weighted average workrate as a function of the SLA compliance data of the software thread. For example, when a software thread completes execution, the computation module 408 may calculate the weighted average workrate corresponding to the execution of the software thread on the selected hardware device 108 and/or may calculate the weighted average workrate corresponding to the execution of multiple software threads of a process being executed on the selected hardware device 108. In one embodiment, the weighted average workrate may be calculated after execution using the following formula: weighted average workrate=(end IC−start IC)/(end VTB−start VTB). In some embodiments, the weighted average workrate may also be calculated during execution of the software thread. In such an embodiment, the weighted average workrate may be calculated using the following formula: weighted average workrate=(IC−start IC)/(VTB−start VTB). In some embodiments, the computation module 408 may function as part of the hypervisor.

The results module 410, in one embodiment, outputs the weighted average workrate of the SLA compliance data of the software thread. In certain embodiments, the results module 410 outputs the weighted average workrate of the SLA compliance data to the operating system 212. In other embodiments, the results module 410 outputs the weighted average workrate of the SLA compliance data to an application, a file, a storage medium, and/or a display. In some embodiments, the results module 410 may function as part of the hypervisor.

Figure 5:
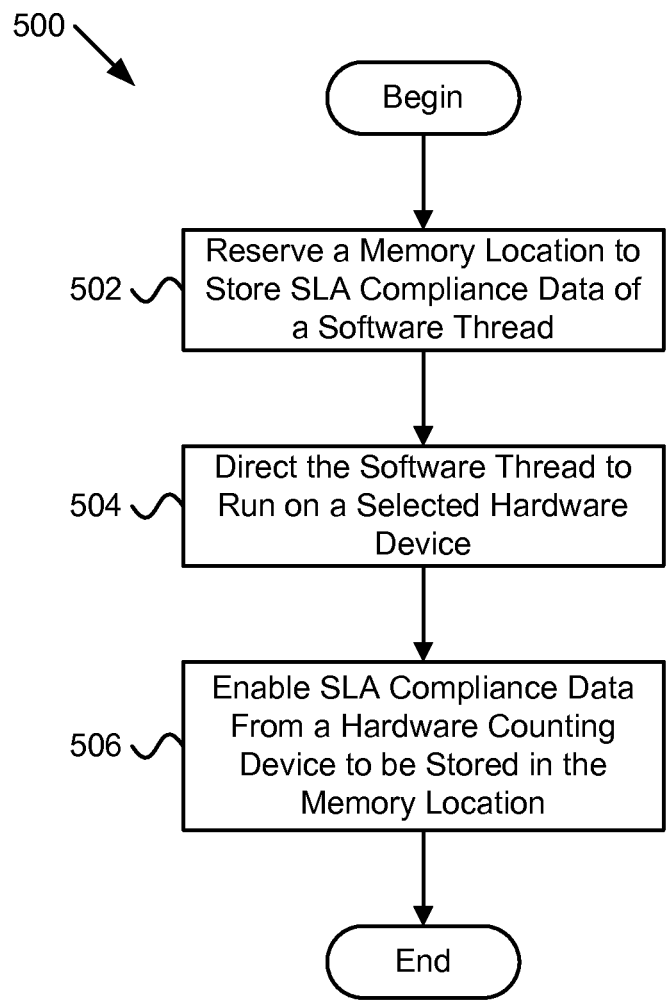
FIG. 5 is a schematic flow chart diagram illustrating one embodiment of a method for storing SLA compliance data in accordance with one embodiment of the present invention.

FIG. 5 is a schematic flow chart diagram illustrating one embodiment of a method 500 for storing SLA compliance data in accordance with one embodiment of the present invention. The method 500 begins and reserves 502 a memory location to store SLA compliance data of a software thread, such as the first software thread 202 or the second software thread 204. In some embodiments, the memory location may be part of the memory 106. The SLA compliance data may include data corresponding to a TB (picket), a number of updates, a measurement period, a PURR, a SPURR, a VTB, an IC, a TB (fence), a start IC, an end IC, a start VTB, an end VTB, a process ID, and the like. In certain embodiments, the reservation module 302 may reserve 502 the memory location to store SLA compliance data of the software thread.

The method 500 directs 504 the software thread to run on a selected hardware device 108. In some embodiments, the directing module 304 may direct 504 the software thread to run on the selected hardware device 108. The method 500 enables 506 SLA compliance data to be stored in the memory location, and the method 500 ends. In one embodiment, the enabling module 306 may enable 506 the SLA compliance data to be stored in the memory location. In some embodiments, the SLA compliance data may be from the hardware counting device 110. In such an embodiment, the hardware counting device 110 is in communication with the selected hardware device 108. The SLA compliance data corresponds to operation of the software thread on the selected hardware device 108.

Figure 6:
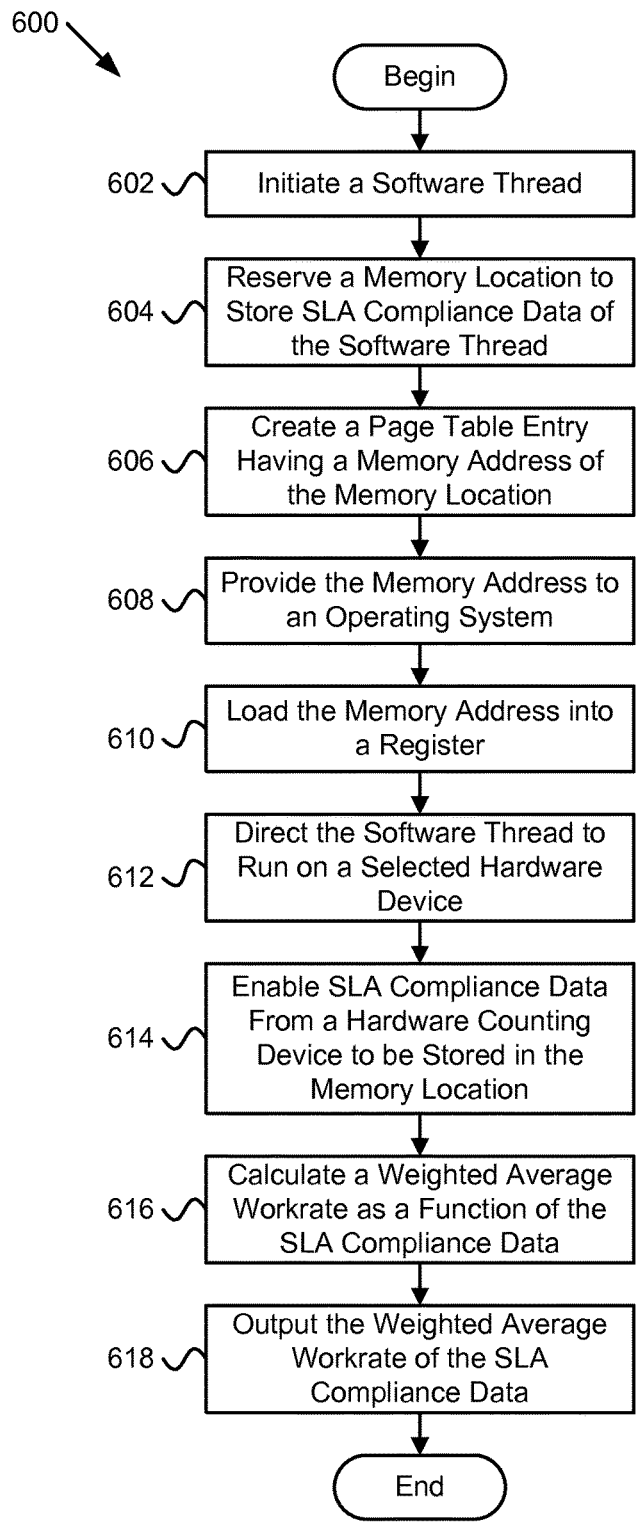
FIG. 6 is a schematic flow chart diagram illustrating another embodiment of a method for storing SLA compliance data in accordance with one embodiment of the present invention.

FIG. 6 is a schematic flow chart diagram illustrating another embodiment of a method 600 for storing SLA compliance data in accordance with one embodiment of the present invention. The method 600 begins and initiates 602 a software thread, such as the first software thread 202 or the second software thread 204. In certain embodiments, the operating system 212 may initiate 602 the software thread and notify the compliance apparatus 102 that the software thread has been initiated. The method 600 reserves 604 a memory location to store SLA compliance data of the software thread. In some embodiments, the memory location may be part of the memory 106. The SLA compliance data may include data corresponding to a TB (picket), a number of updates, a measurement period, a PURR, a SPURR, a VTB, an IC, a TB (fence), a start IC, an end IC, a start VTB, an end VTB, a process ID, and the like. In certain embodiments, the reservation module 302 may reserve 604 the memory location to store SLA compliance data of the software thread in response to the software thread being initiated.

The method 600 creates 606 a page table entry having a memory address of the memory location. The page table entry may include the memory address, a hardware bit corresponding to the hardware that includes the memory address, a process ID, and/or a thread ID corresponding to the software thread. In certain embodiments, the paging module 402 may create 606 the page table entry having the memory address of the memory location.

The method 600 provides 608 the memory address to the operating system 212. As may be appreciated, the memory address may be read-only by the operating system 212 to protect the data from being tampered with. In some embodiments, the linking module 404 may provide 608 the memory address to the operating system 212. The method 600 loads 610 the memory address of the memory location into a register that holds the memory address during the software thread being run on the selected hardware device 108. In some embodiments, the register may be the base address register 210. In certain embodiments, the registration module 406 may load 610 the memory address into the register.

The method 600 directs 612 the software thread to run on a selected hardware device 108. In some embodiments, the directing module 304 may direct 612 the software thread to run on the selected hardware device 108. The method 600 enables 614 SLA compliance data to be stored in the memory location. In one embodiment, the enabling module 306 may enable 614 the SLA compliance data to be stored in the memory location. In some embodiments, the SLA compliance data may be from the hardware counting device 110. In such an embodiment, the hardware counting device 110 is in communication with the selected hardware device 108. The SLA compliance data corresponds to operation of the software thread on the selected hardware device 108.

The method 600 calculates 616 a weighted average workrate as a function of the SLA compliance data. In one embodiment, the computation module 408 may calculate 616 the weighted average workrate as a function of the SLA compliance data. The weighted average workrate may be calculated using any suitable method or formula, such as one of the formulas presented herein. The method 600 outputs 618 the weighted average workrate of the SLA compliance data and the method 600 ends. In one embodiment, the results module 410 outputs the weighted average workrate of the SLA compliance data.

Figure 7:
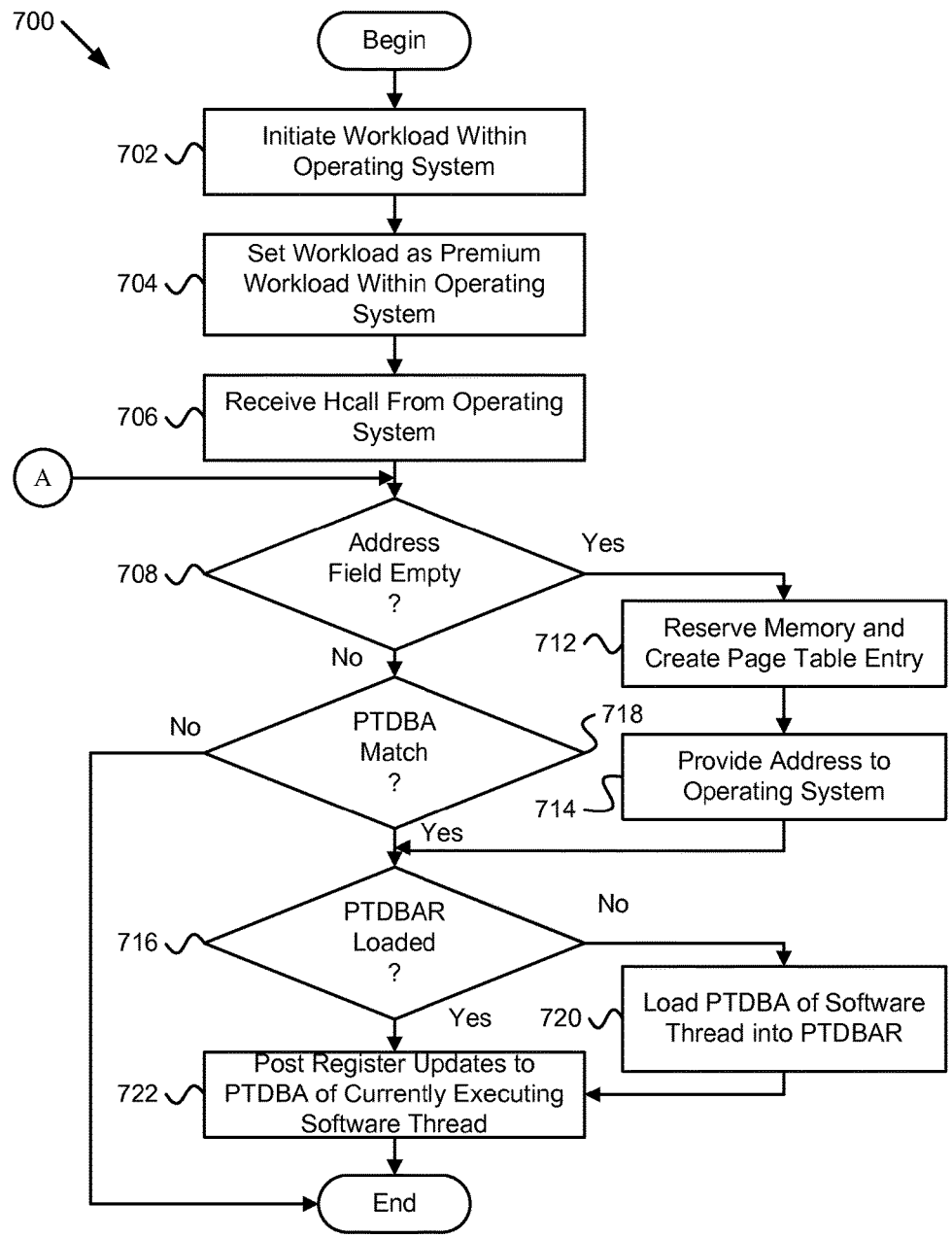
FIG. 7 is a schematic flow chart diagram illustrating an embodiment of a method for storing SLA compliance data for a new software thread in accordance with one embodiment of the present invention.

FIG. 7 is a schematic flow chart diagram illustrating an embodiment of a method 700 for storing SLA compliance data for a new software thread in accordance with one embodiment of the present invention. The method 700 begins by initiating 702 a workload process within an operating system 212. The operating system 212 may be any suitable operating system, such as Android, Berkeley Software Distribution ("BSD"), iOS, Linux, OS X, QNX, Microsoft Windows, Windows Phone, and IBM z/OS. In certain embodiments, the computing device 104 may be used to initiate 702 the workload process within the operating system 212. The method 700 sets 704 the workload process as a premium workload within the operating system 212. In some embodiments, the workload process sets 704 itself as a premium workload within the operating system 212. For example, the workload process may register itself with the operating system 212 by setting an environmental variable, such as by setting "PREMIUM_WORKLOAD=TRUE." As may be appreciated, a premium workload may be given higher priority for execution than a non-premium workload. For example, a premium workload may be executed before a non-premium workload. As another example, a premium workload may be given a greater number of resources and/or greater quality of resources than a non-premium workload.

In certain embodiments, the workload process starts a user space software thread (e.g., thread A). After the workload process starts the software thread, the operating system 212 reads the environmental variable to determine if the workload process is a premium workload. If the workload process is a premium workload, the operating system 212 may make a call to a hypervisor with the process ID, thread ID, and an empty address field as arguments to initialize the software thread. For example, the call to the hypervisor may take the form "Hcall<process id, thread id, address (empty)>."

The method 700 receives 706 the Hcall from the operating system 212. As may be appreciated, an Hcall may be a call to a hypervisor used to initialize a software thread, terminate a software thread, and/or to retrieve SLA data corresponding to operation of one or more software threads. In some embodiments, the compliance apparatus 102 and/or the hypervisor may receive 706 the Hcall from the operating system 212.

In various embodiments, the methods 800 and 900 of FIGS. 8 and 9 make use of elements 708 through 722 described below (follow A on FIGS. 8 and 9 to A on this figure). The method 700 determines 708 whether the address field in the Hcall is empty. In some embodiments, the compliance apparatus 102 and/or the hypervisor may determine 708 whether the address field in the Hcall is empty.

In certain embodiments, the compliance apparatus 102 and/or the hypervisor maintain page table entries corresponding to all premium software threads that have reserved space. In such embodiments, if it is determined 708 that the address field is empty, the method 700 may check its page table entries to look for the thread ID associated with the software thread. If the method 700 does not find the thread ID in the page table entries, the method 700 may determine that the software thread associated with the thread ID is a new software thread. The method 700 may reserve 712 a memory location for the software thread and/or create a page table entry corresponding to the software thread. For example, the method 700 may reserve 712 a PTDBA-A for the software thread A. In certain embodiments, the memory location for the software thread may be read-only by the operating system 212 and/or accessible directly (e.g., without going through the compliance apparatus 102 and/or the hypervisor). In some embodiments, the reservation module 302 may reserve 712 the memory location for the software thread. Moreover, in one embodiment, the paging module 402 may create the page table entry.

In some embodiments, the method 700 creates a page table entry that includes the memory location, the thread ID, the process ID, and a hardware bit corresponding to the memory location. The hardware bit may be used to validate future requests that come from the operating system 212 to re-run existing premium software threads. In certain embodiments, the method 700 may reserve a range of memory addresses that may be used to satisfy the memory allocation for new software threads. The method 700 provides 714 the memory address to the operating system 212. In some embodiments, the compliance apparatus 102 the linking module 404, and/or the hypervisor provide 714 the memory address to the operating system 212. The method 700 then determines 716 whether the PTDBAR is loaded with the PTDBA.

If the method 700 determines 708 that the address field is not empty, the method 700 determines 718 whether the PTDBA has a match in the page table. If the PTDBA does not have a match in the page table, the method 700 ends. However, if the PTDBA does have a match in the page table, the method 700 also determines 716 whether the PTDBAR is loaded with the PTDBA.

If the method 700 determines 716 that the PTDBAR is not loaded with the PTDBA, the method 700 loads 720 the PTDBA of the software thread into the PTDBAR. The method 700 enables the hardware counting device 110 to update the PTDBA at every update interval. Moreover, the method 700 executes the software thread on a selected hardware device 108. The method 700 then posts 722 register updates to the PTDBA for the software thread while the software thread is being executed and then the method 700 ends. For example, the hardware counting device 110 may provide data corresponding to the software thread, such as a TB (picket), a number of updates, a measurement period, a PURR, a SPURR, a VTB, an IC, a TB (fence), a start IC, an end IC, a start VTB, an end VTB, a process ID, and the like, to the PTDBA. In certain embodiments, the hardware counting device 110 may find the address of the software thread currently being executed by looking at the PTDBA stored in the PTDBAR. In some embodiments, the hardware counting device 110 updates the data in the PTDBA at every update interval possible (e.g., to match a clock rate).

If the method 700 determines 716 that the PTDBAR is loaded, the method 700 posts 722 register updates to the PTDBA for the software thread while the software thread is being executed and then the method 700 ends. For the first update of the PTDBA, the method 700 copies the IC from the IC register 224 into the start IC field 244, and the VTB from the VTB register 226 into the start VTB field 248. Furthermore, during the first update, the method 700 copies the process ID corresponding to the workload process into the process ID field 252. At every update interval during execution of the software thread, the method 700 populates the TB (picket) field 228, the number of updates field 230, the measurement period field 232, the PURR field 234, the SPURR field 236, the virtual TB field 238, the IC field 240, and the TB (fence) field 242 using data from the TB register 218, the PURR register 220, the SPURR register 222, the VTB register 226, and the IC register 224.

In some embodiments, the workload process starts a second user space software thread (e.g., thread B). After the workload process starts the second software thread, the operating system 212 may make a call to a hypervisor with the process ID, thread ID, and an empty address field as arguments to initialize the second software thread. For example, the call to the hypervisor may take the form "Hcall<process id, thread id, address (empty)>."

The method 700 receives 706 the Hcall from the operating system 212. The method 700 determines 708 whether the address field in the Hcall is empty. If it is determined 708 that the address field is empty, the method 700 may check its page table entries to look for the thread ID associated with the second software thread. If the method 700 does not find the thread ID in the page table entries, the method 700 may determine that the second software thread associated with the thread ID is a new software thread. The method 700 may reserve 712 a memory location for the second software thread and/or create a page table entry corresponding to the second software thread. For example, the method 700 may reserve 712 a PTDBA-B for the software thread B. Moreover, in one embodiment, the paging module 402 may create the page table entry. The method 700 provides 714 the memory address to the operating system 212. The method 700 then determines 716 whether the PTDBAR is loaded with the PTDBA.

If the method 700 determines 716 that the PTDBAR is not loaded with the PTDBA, the method 700 loads 720 the PTDBA (e.g., PTDBA-B) of the second software thread (e.g., thread B) into the PTDBAR. In certain embodiments, the method 700 may populate the PTDBA for the first software thread (e.g., thread A) before loading 720 the PTDBA of the second software thread into the PTDBAR. The method 700 enables the hardware counting device 110 to update the PTDBA at every update interval. Moreover, the method 700 executes the software thread on a selected hardware device 108. The method 700 then posts 722 register updates to the PTDBA for the software thread while the software thread is being executed and then the method 700 ends.

If the method 700 determines 716 that the PTDBAR is loaded, the method 700 posts 722 register updates to the PTDBA for the software thread while the software thread is being executed and then the method 700 ends.

In certain embodiments, the method 700 may execute the first software thread a second time. In such an embodiment, the operating system 212 may make a call to a hypervisor with the process ID, thread ID, and a populated address field as arguments to initialize the first software thread. For example, the call to the hypervisor may take the form "Hcall<process id, thread id, PTDBA-A address>."

The method 700 receives 706 the Hcall from the operating system 212. The method 700 determines 708 whether the address field in the Hcall is empty. If it is determined 708 that the address field is not empty, as in the present example, the method 700 determines 718 whether there is a PTDBA match. If the method 700 determines 718 that there is a PTDBA match, as in the present example, the method 700 determines 716 whether the PTDBAR is loaded with the PTDBA. In certain embodiments, determining 718 whether there is a PTDBA match may include determining whether the thread ID is located in the page table, if the address for the first thread (e.g., thread A) has a corresponding hardware bit set, and/or whether the address is within a predetermined range used to allocate memory to software threads.

If the method 700 determines 718 that there is not a PTDBA match, the method 700 may provide feedback to the operating system 212 before the method 700 ends. For example, the method 700 may provide feedback to the operating system 212 that the hardware bit is not set and/or that the address is not within the predetermined range used to allocate memory to software threads. In such an example, the method 700 may provide feedback in the following format: "<thread ID, BAD ADDRESS>.

If the method 700 determines 716 that the PTDBAR is not loaded with the PTDBA, as in the present example, the method 700 loads 720 the PTDBA (e.g., PTDBA-A) of the first software thread (e.g., thread A) into the PTDBAR. The method 700 enables the hardware counting device 110 to update the PTDBA at every update interval. Moreover, the method 700 executes the software thread on a selected hardware device 108. The method 700 then posts 722 register updates to the PTDBA for the software thread while the software thread is being executed and then the method 700 ends.

As may be appreciated, the operating system 212 may read accumulated data from the PTDBA that it has been provided with. After a time interval, the operating system 212 may again read the accumulated data from the same PTDBA. Because the data is obtained from the PTDBA in an incremental manner, the operating system 212 may determine deltas between two subsequent counts for calculating metrics. In certain embodiments, certain threads may be premium threads while other threads may not be premium threads. In such embodiments, preference for execution may be given to the premium threads. As may be appreciated, in certain embodiments, the method 700 may be performed in whole or in part by one or more of the computing device 104, the compliance apparatus 102, and the hypervisor.

Figure 8:
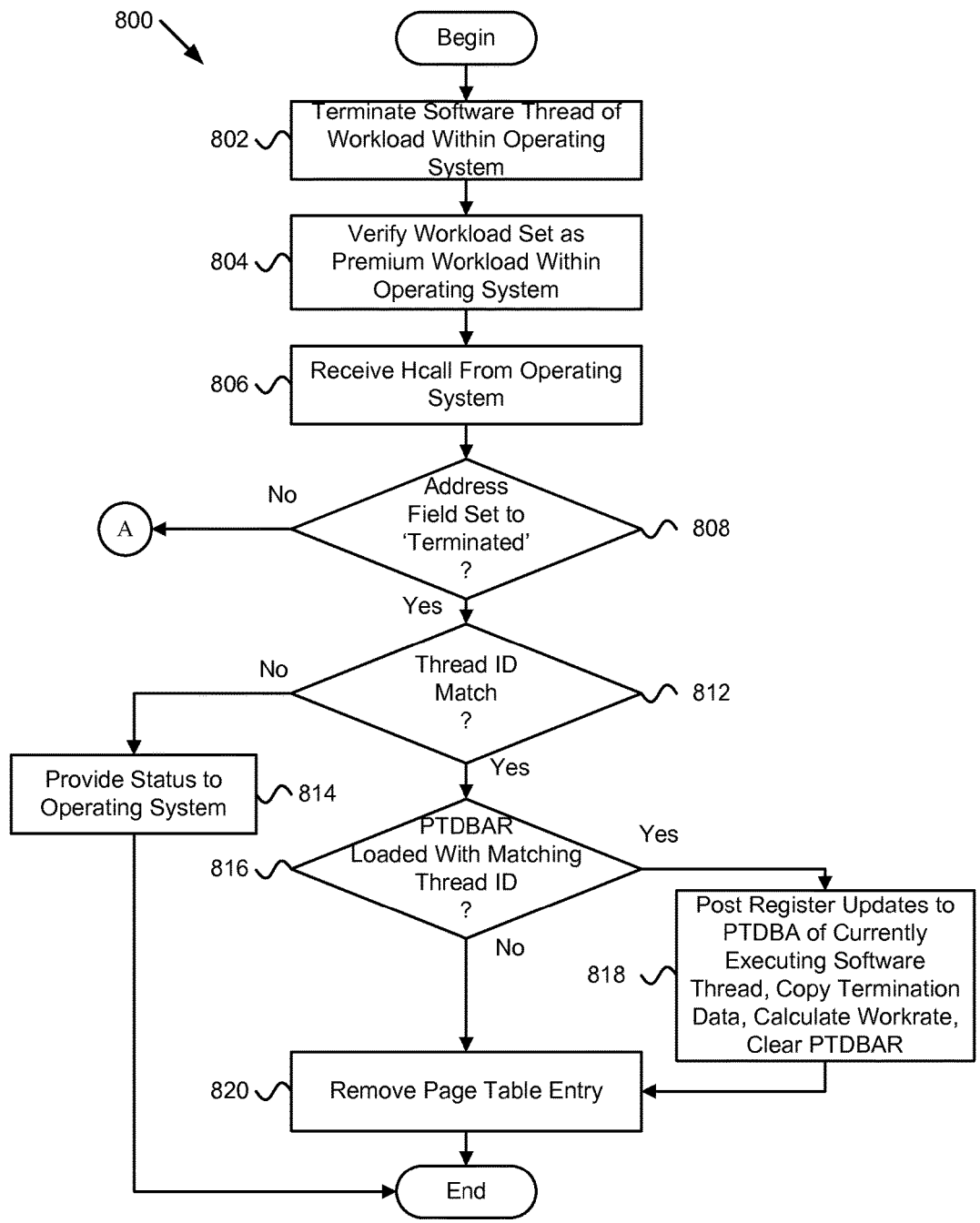
FIG. 8 is a schematic flow chart diagram illustrating an embodiment of a method for storing SLA compliance data for a software thread being terminated in accordance with one embodiment of the present invention.

FIG. 8 is a schematic flow chart diagram illustrating an embodiment of a method 800 for storing SLA compliance data for a software thread being terminated in accordance with one embodiment of the present invention. The method 800 begins by terminating 802 a software thread within an operating system 212. In certain embodiments, the computing device 104 may be used to terminate 802 the software thread within the operating system 212. The method 800 may verify 804 that the workload process corresponding to the software thread is registered as a premium workload within the operating system 212. For example, the method 800 may verify 804 that the workload process has an environmental variable setting of "PREMIUM_WORKLOAD=TRUE."

If the workload process is a premium workload, the operating system 212 may make a call to a hypervisor with the process ID, thread ID, and "TERMINATED" as arguments to terminate the software thread. For example, the call to the hypervisor may take the form "Hcall<process id, thread id,<TERMINATED>>."

The method 800 receives 806 the Hcall from the operating system 212. The method 800 determines 808 whether the address field in the Hcall is set to "TERMINATED." If the method 800 determines 808 that the address field in the Hcall is not set to "TERMINATED," the method 800 determines 708 if the address field in the Hcall is empty (follow A on this figure to A on FIG. 7). The method 800 then proceeds through the remaining elements 712 through 722 of FIG. 7, and the method 800 ends.

If the method 800 determines 808 that the address field in the Hcall is set to "TERMINATED," the method 800 then determines 812 whether the thread ID from the Hcall matches an entry in the page table. If the method 800 determines 812 that the thread ID does not match an entry in the page table, the method 800 provides 814 status to the operating system 212 to notify the operating system 212 that the thread ID does not match any entry in the page table, and the method 800 ends. For example, the response to the operating system 212 may take the following form "<thread ID, "BADTERMINATION">."

If the method 800 determines 812 that the thread ID does match an entry in the page table, the method 800 determines 816 whether the PTDBAR is loaded with a memory address corresponding to the thread ID. If the method 800 determines 816 that the PTDBAR is loaded with the memory address corresponding to the thread ID, the method 800 posts 818 register updates from the hardware counting device 110 to the PTDBA of the currently executing software thread (e.g., the thread to be terminated). The method 800 then copies the IC to the end IC field 246 and copies the VTB to the end VTB field 250. The method 800 also calculates a workrate for the thread. In certain embodiments, the workrate may be calculated using the following formula: workrate=(end IC−start IC)/(end VTB−start VTB). In some embodiments, the calculated workrate may be posted in the PTDBA. In one embodiment, the method 800 clears the PTDBAR to complete termination of the thread. The method 800 then removes 820 the entry in the page table that includes the software thread. In certain embodiments, the method 800 also clears the hardware bit from the page table, and the method 800 ends.

If the method 800 determines 816 that the PTDBAR is not loaded with the memory address corresponding to the software thread, the method 800 removes 820 the entry in the page table that includes the software thread and may also clear the hardware bit from the page table, and the method 800 ends. As may be appreciated, in certain embodiments, the method 800 may be performed in whole or in part by one or more of the computing device 104, the compliance apparatus 102, and the hypervisor.

Figure 9:
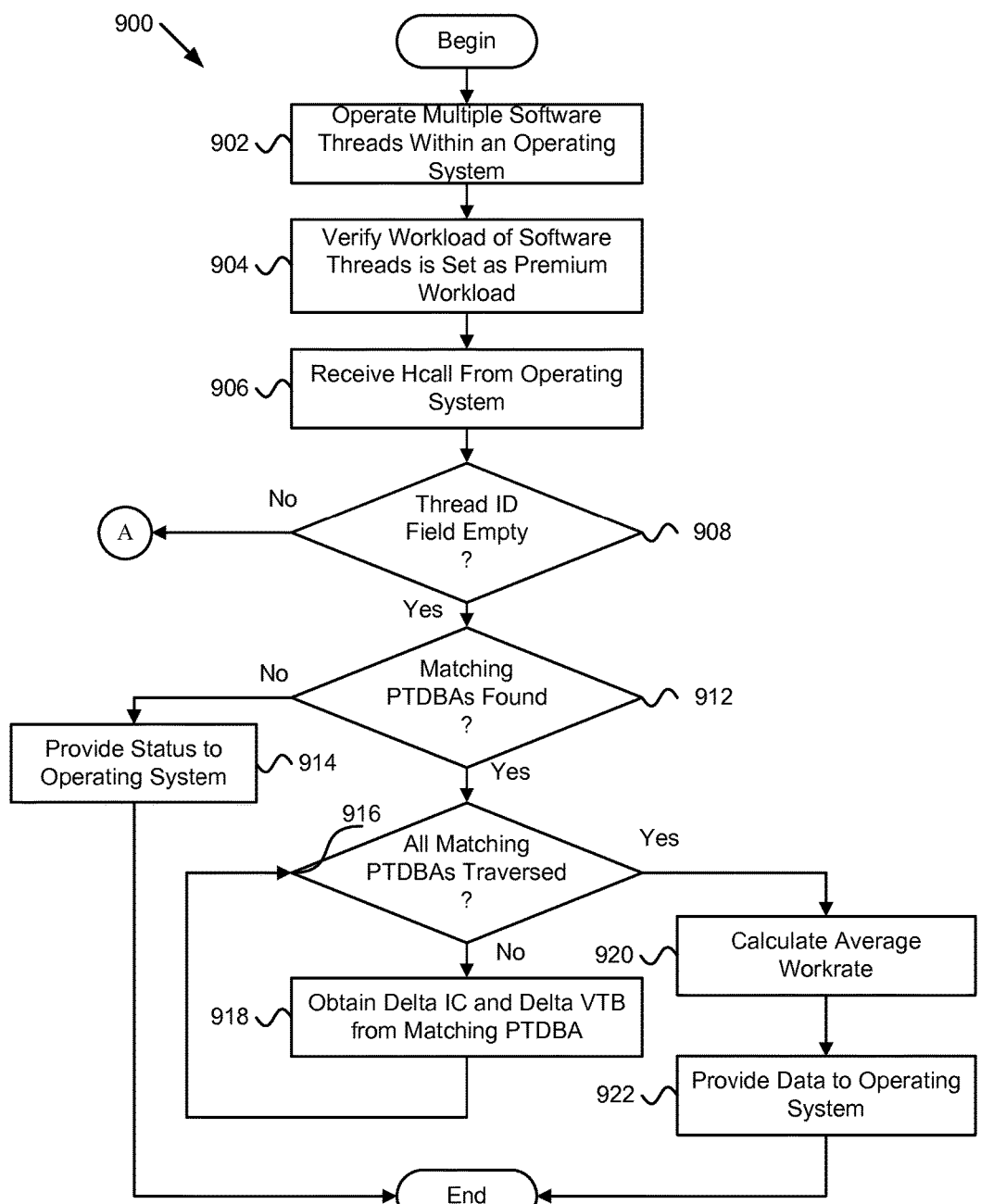
FIG. 9 is a schematic flow chart diagram illustrating an embodiment of a method for retrieving SLA compliance data in accordance with one embodiment of the present invention.

FIG. 9 is a schematic flow chart diagram illustrating an embodiment of a method 900 for retrieving SLA compliance data in accordance with one embodiment of the present invention. The method 900 begins by operating 902 multiple software threads within an operating system 212. In certain embodiments, the computing device 104 may be used to operate 902 the multiple software threads within the operating system 212. The method 900 may verify 904 that the workload process corresponding to the multiple software threads is registered as a premium workload within the operating system 212. For example, the method 900 may verify 904 that the workload process has an environmental variable setting of "PREMIUM_WORKLOAD=TRUE."

If the workload process is a premium workload, the operating system 212 may make a call to a hypervisor with the process ID, empty thread ID field, and empty address field. For example, the call to the hypervisor may take the form "Hcall<process id, <empty>,<empty>>."

The method 900 receives 906 the Hcall from the operating system 212. The method 900 determines 908 whether the thread ID field in the Hcall is empty. If the method 900 determines 908 that the thread ID field in the Hcall is not empty, the method 900 determines 708 if the address field in the Hcall is empty (follow A on this figure to A on FIG. 7). The method 900 then proceeds through the remaining elements 712 through 722 of FIG. 7, and the method 900 ends.

If the method 900 determines 908 that the thread ID field in the Hcall is empty, the method 900 then determines 912 whether there are entries in the page table with PTDBAs that correspond to the process ID. If the method 900 determines 912 that there are no entries in the page table with PTDBAs that correspond to the process ID, the method 900 provides 914 status to the operating system 212 to notify the operating system 212 that the process ID does not match any entry in the page table, and the method 900 ends. For example, the response to the operating system 212 may take the following form "<process ID, <empty>,"NOMATCH">."

If the method 900 determines 912 that there are entries in the page table with PTDBAs that correspond to the process ID, the method 900 determines 916 whether all matching entries in the page table with PTDBAs that correspond to the process ID have been traversed. If the method 900 determines 916 that all matching entries have not been traversed, the method 900 obtains 918 a delta IC (e.g., IC−start IC) and a delta VTB (e.g., VTB−start VTB) for one of the matching PTDBAs that has not been traversed. The method 900 then again determines 916 whether all matching entries in the page table have been traversed. This is repeated until all matching entries in the page table have been traversed.

If the method 900 determines 916 that all matching entries have been traversed, the method 900 calculates 920 an average workrate for the entire process. For example, the method 900 may calculate 920 the average workrate for the entire process using the following formula: sum(delta IC for each thread)/sum(delta VTB for each thread). The method 900 provides 922 the data to the operating system 212, and the method 900 ends. In certain embodiments, the method 900 may provide 922 the data to the operating system 212 using the following format: "<process ID>, <average workrate for the process>, <thread ID 1>, <delta IC for thread 1>, <delta VTB for thread 1>, . . . <thread n>." In certain embodiments, after providing 922 the data to the operating system 212, the method 900 may free up the PTDBAs that were used for computing the average workrate. As may be appreciated, computing the workrate during workload execution may enable comparisons to be made during various stages of the workload execution to determine whether the process is operating as expected.

In certain embodiments, a user may compare the workrate against a requested workrate to determine whether a SLA is matched or met. For example, if an expected workrate is 10 and the actual workrate is 8, an 80% SLA rate may be achieved. In some environments, the actual workrate may be used for charging customers based on the level of performance achieved. As may be appreciated, in certain embodiments, the method 900 may be performed in whole or in part by one or more of the computing device 104, the compliance apparatus 102, and the hypervisor.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for storing service level agreement (SLA) compliance data comprising:
  reserving a physical memory location to store SLA compliance data of a software thread;
  directing the software thread to run on a selected hardware device; and
  enabling the SLA compliance data to be stored in the physical memory location, the SLA compliance data from a hardware counting device in communication with the selected hardware device, wherein the SLA compliance data corresponds to operation of the software thread on the selected hardware device, and wherein the physical memory location is read-only by an operating system and directly accessible for writing by the hardware counting device.

2. The method of claim 1, further comprising creating a page table entry having a memory address of the physical memory location.

3. The method of claim 1, further comprising providing a memory address of the physical memory location to an operating system to enable the operating system to read data as a function of the memory address.

4. The method of claim 1, further comprising loading a memory address of the physical memory location into a register that holds the memory address during the software thread being run on the selected hardware device.

5. The method of claim 1, wherein reserving a physical memory location to store SLA compliance data of a software thread is in response to the software thread being initiated.

6. The method of claim 1, wherein the physical memory location is updated by the hardware counting device at an update interval that matches a clock rate of the selected hardware device.

7. The method of claim 1, wherein the SLA compliance data comprises a timebase ("TB") and an instruction count ("IC").

8. The method of claim 1, further comprising outputting a weighted average workrate of the SLA compliance data of the software thread.

9. The method of claim 1, wherein the hardware counting device operates independently from the selected hardware device.

10. The method of claim 1, wherein the software thread comprises a first software thread and further comprising a second software thread, wherein enabling SLA compliance data to be stored in the physical memory location comprises enabling SLA compliance data corresponding to operation of the first software thread on the selected hardware device to be stored in a first physical memory location, and enabling SLA compliance data corresponding to operation of the second software thread on the selected hardware device to be stored in a second physical memory location.

* * * * *